March 21, 1933.    A. ABRAMSON    1,901,942
DEVICE FOR TURNING PISTON RINGS
Filed July 8, 1931

ALEXANDER ABRAMSON~
INVENTOR

BY *Haseltine, Lake & Co.,*
ATTORNEYS

Patented Mar. 21, 1933

1,901,942

UNITED STATES PATENT OFFICE

ALEXANDER ABRAMSON, OF PRAGUE, CZECHOSLOVAKIA

DEVICE FOR TURNING PISTON RINGS

Application filed July 8, 1931, Serial No. 549,430, and in Germany July 17, 1930.

This invention relates to a process and corresponding apparatus for turning piston rings of the type in which a piston ring is held during operation between the surface plate of the lathe and an auxiliary flanged plate or ring, in such manner that, when the inner face of the piston ring has been turned down, a flanged disc may be inserted through the aperture of the auxiliary ring to hold the piston ring securely in position for turning down of the outer face.

In a hitherto known arrangement of this type the auxiliary clamping ring is screw-threaded at its lower end for engagement with the surface plate of the lathe, the piston ring being held between said surface plate and the flanged auxiliary ring, the effective diameter of the flange being greater than the inner diameter, and less than the outer diameter, of the piston ring. This arrangement, however, is not entirely satisfactory since the ring must be carefully constructed of a gauge such that it will accurately encircle the piston ring and prevent distortion of said piston ring during tightening of the auxiliary ring on the surface plate. This interferes with the treatment of the piston rings, particularly if several rings are being treated in one operation, since the auxiliary ring surrounds the outer face of the piston ring or rings and renders it difficult to determine the point of contact of said ring or rings adjacent the supporting surface plate of the lathe.

A further disadvantage, however, lies in the fact that, with this known arrangement, only one of the clamping members i. e. the supporting portion of the surface plate, engages the piston ring centrally with respect to its width, the other clamping member i. e.
either the auxiliary ring or the auxiliary disc, engaging only the annular edge of the ring. The direction of the resulting clamping pressure therefore deviates from the axial plane of the device and tends to cause the piston rings to tip or bend. This is particularly noticeable when a number of piston rings are being turned in the same operation. Moreover, the use of this arrangement is undesirable with piston rings of less than, for example, 4 m. m. thickness, since the rings are liable to fracture and only an ineffective clamping will obtain.

The invention has for its object to overcome these disadvantages and consists in providing a pair of clamping rings between which the piston ring or rings to be turned down are held, said clamping rings being of equal diameter and co-axially aligned, so that the resulting clamping pressure is parallel with the axis of the assembled device and is centrally disposed with respect to the width of the piston ring or rings.

A further object of the invention lies in the provision of clamping means by which any number of piston rings may be treated in one operation.

Figure 1:
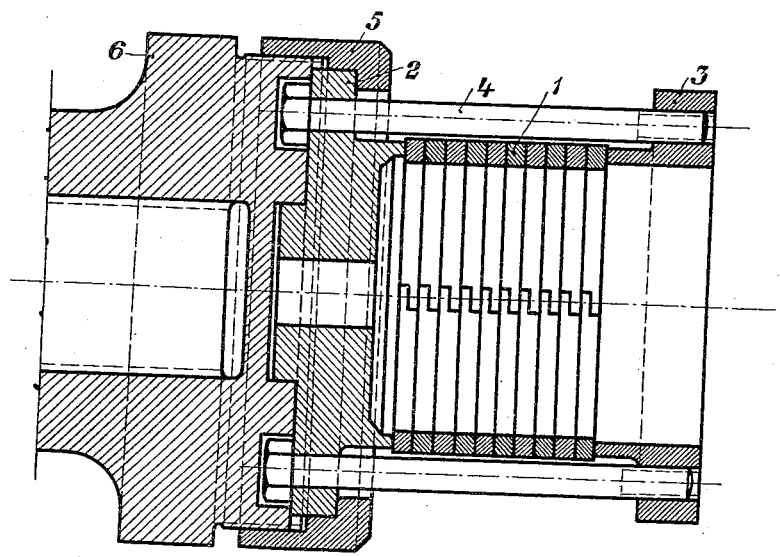
Figure 1 shows a longitudinal section of the device with a number of piston rings assembled for turning the inner edges.

1 illustrates a piston ring, of which a plurality are shown as assembled between the annular clamping rings 2, 3. The clamping rings are held together by means of bolts 4 passing freely through holes in the plate 2 and being threaded into corresponding holes in the plate 3. The rings 2, 3 are provided with inwardly directed, annular, axially aligned portions $2^a$, $3^a$ of equal diameter adapted to engage the outer faces of the end rings and when these latter are clamped in position by the bolts 4 said annular portions $2^a$, $3^a$ engage centrally of the piston rings with respect to their width as shown in the drawing.

After the device has been thus far assembled it is secured to the surface plate 6 of the lathe by means of a threaded disc or cap 5, flanged to engage over the inner end clamping plate 2 and the turning operation on the inner edges of the piston rings may now be effected.

Figure 2:
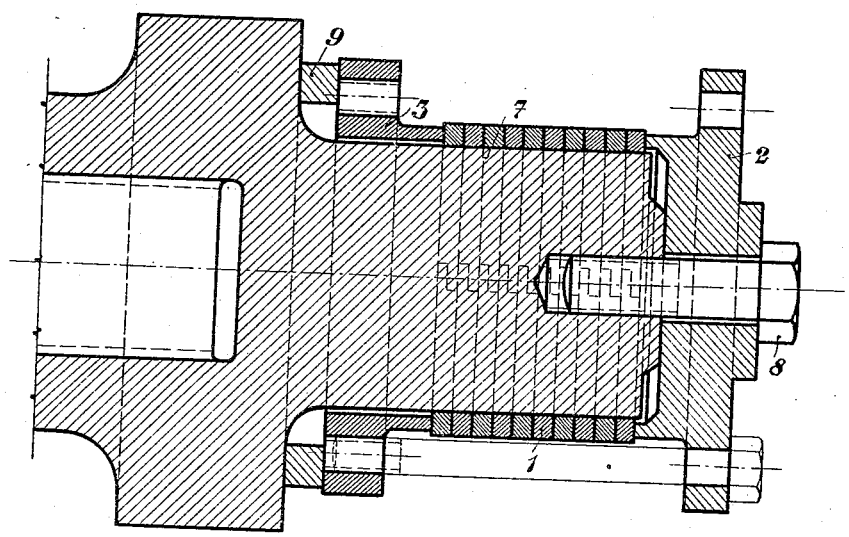
Figure 2 is a longitudinal section of the device assembled for turning of the outer edges of the piston rings.

When this operation has been completed the cap 5 is unscrewed from the surface plate 6, and the piston rings 1 and clamping plates 2 and 3, still securely held together by the bolts 4, are reversed and slid bodily on to a mandrel 7 (Figure 2) of a further surface plate. The end ring 3 is spaced from the surface plate by means of a ring 9 whilst the assembled piston ring 1 and the end rings 2, 3 are then securely attached to the mandrel 7 as by a bolt 10 passing through a hole in the outer clamping plate 2 and threaded into a hole in the mandrel. The bolts 4 are then entirely withdrawn, the piston rings being, however, securely held in axially aligned position for the turning of their outer edges.

What I claim and desire to secure by Letters Patent of the United States is:—

1. Means for assembling piston rings in order to turn their arcuate outer and inner faces, including the combination of a pair of clamping rings adapted to clamp between them the end faces of a series of piston rings intermediate the arcuate outer and inner faces thereof, which pair of clamping rings are adapted to be temporarily secured together with the intermediately clamped piston rings into an assembled unit, and in which pair, one clamping ring is provided exteriorly with means adapting the ring to fit centrally upon a face plate on a lathe and be secured thereto for turning the interior of said series of piston rings, the other clamping ring having a clearance opening therein providing for the entrance of a tool and escape of turnings, and means upon said first clamping ring adapting the same when said assembled unit is axially reversed and passed in upon a flanged mandrel interchangeable with said face plate, to be secured to the end of said mandrel and thereby clamp said other clamping ring against the flange upon said mandrel, whereupon said piston rings are adapted to be exteriorly turned.

2. Means for assembling piston rings in order to turn their arcuate outer and inner faces, including the combination of a pair of clamping rings adapted to clamp between them the end faces of a series of piston rings intermediate the arcuate outer and inner faces thereof, which pair of clamping rings are adapted to be temporarily secured together with the intermediately clamped piston rings into an assembled unit by means of removable clamping bolts arranged exteriorly to said piston rings, means for centering one of said pair of clamping rings upon the face plate of a lathe and a flange upon said one ring adapted to be engaged and retained by a retaining collar attachable to said face plate in order to provide for turning of the interior of the piston rings, the other of said pair of clamping rings having a clearance opening for the entry of a tool and the escape of turnings, there being an aperture in said first clamping ring adapted when said ring assembly is axially reversed and passed in upon a flanged mandrel, to receive a clamping screw attachable to the end of said mandrel in order to clamp said other clamping ring against the flange on said mandrel and provide for removal of said exteriorly arranged clamping bolts and exterior turning of said piston rings.

3. Means for assembling piston rings in order to turn their arcuate outer and inner faces, including the combination of a pair of clamping rings adapted to clamp between them the end faces of a series of piston rings intermediate the arcuate outer and inner faces thereof, which pair of clamping rings are adapted to be temporarily secured together with the intermediately clamped piston rings into an assembled unit, means for centering one of said pair of clamping rings upon the face plate of a lathe including a projection on the one and a corresponding recess in the other and means for releasably attaching said one ring to said face plate in order to provide for turning of the interior of the piston rings, the other of said pair of clamping rings having a clearance opening for the entry of a tool and the escape of turnings, there being an aperture in said first clamping ring adapted when said ring assembly is axially reversed and passed in upon a flanged mandrel, to receive a clamping screw attachable to the end of said mandrel in order to clamp said other clamping ring against the flange on said mandrel and provide for arcuate exterior turning of said piston rings.

4. Means for assembling piston rings in order to turn their arcuate outer and inner faces, including the combination of a pair of clamping rings adapted to clamp between them the end faces of a series of piston rings intermediate the arcuate outer and inner faces thereof, which pair of clamping rings are adapted to be temporarily secured together with the intermediately clamped piston rings into an assembled unit by means of removable clamping bolts arranged exteriorly to said piston rings, means for centering one of said pair of clamping rings upon the face plate of a lathe, including a central projection on said ring and a corresponding recess in said face plate, and means for releasably attaching said one ring to said face plate in order to provide for turning of the interior of the piston including a flange upon said one ring adapted to be engaged and retained by a retaining collar attachable to said face plate, the other of said pair of clamping rings having a clearance opening for the entry of a tool and the escape of turnings, there being an aperture in said first clamping ring adapted when said ring assembly is axially reversed and passed in upon a flanged mandrel, to receive a clamping screw attachable to the end of said mandrel in order to clamp said other clamping ring against the flange on said mandrel and provide for removal of said exteriorly arranged clamping bolts and exterior turning of said piston rings.

5. Apparatus according to claim 2 wherein the heads of the exterior clamping bolts when in position extend into recesses in the face plate.

ALEXANDER ABRAMSON.